(12) United States Patent
Douglas et al.

(10) Patent No.: US 8,111,387 B2
(45) Date of Patent: Feb. 7, 2012

(54) METHODS AND SYSTEMS FOR WHEEL PROFILE MEASUREMENT

(75) Inventors: Michael W. Douglas, St. Charles, MO (US); Leigh R. Burns, Jr., Troy, IL (US)

(73) Assignee: Hunter Engineering Company, Bridgeton, MO (US)

( * ) Notice: Subject to any disclaimer, the term of this patent is extended or adjusted under 35 U.S.C. 154(b) by 278 days.

(21) Appl. No.: 12/463,150

(22) Filed: May 8, 2009

(65) Prior Publication Data
US 2009/0279077 A1    Nov. 12, 2009

(51) Int. Cl.
*G01C 1/00* (2006.01)
(52) U.S. Cl. .................................. 356/139.09
(58) Field of Classification Search .............. 356/139.09
See application file for complete search history.

(56) References Cited

U.S. PATENT DOCUMENTS

| | | | | |
|---|---|---|---|---|
| 5,054,918 A * | 10/1991 | Downing et al. | ......... | 356/139.09 |
| 5,494,336 A * | 2/1996 | Russell | ..................... | 301/37.372 |
| 5,731,870 A * | 3/1998 | Bartko et al. | ............ | 356/139.09 |
| 5,808,732 A * | 9/1998 | Williams | .................. | 356/139.01 |
| 5,827,964 A * | 10/1998 | Douine et al. | ................... | 73/466 |
| 6,122,957 A * | 9/2000 | Bux et al. | ........................... | 73/66 |
| 6,244,108 B1 * | 6/2001 | McInnes et al. | ................. | 73/462 |
| 6,535,281 B2 * | 3/2003 | Conheady et al. | ........ | 356/139.09 |
| 6,657,711 B1 * | 12/2003 | Kitagawa et al. | .............. | 356/155 |
| 7,064,818 B2 * | 6/2006 | Braghiroli | ................ | 356/139.09 |
| 7,065,444 B2 * | 6/2006 | Braghiroli | ....................... | 701/124 |
| 7,199,873 B2 * | 4/2007 | Braghiroli | ................ | 356/139.09 |
| 7,199,880 B2 * | 4/2007 | Braghiroli | ...................... | 356/601 |
| 7,221,441 B2 * | 5/2007 | Douglas et al. | ........... | 356/139.09 |
| 7,495,755 B2 * | 2/2009 | Voeller et al. | ............. | 356/139.09 |
| 7,564,569 B2 * | 7/2009 | Mian et al. | .................... | 356/601 |
| 7,738,120 B2 | 6/2010 | Braghiroli | | |
| 2004/0165180 A1 * | 8/2004 | Voeller et al. | ............. | 356/139.09 |
| 2005/0052657 A1 * | 3/2005 | Braghiroli | ...................... | 356/602 |
| 2005/0285928 A1 | 12/2005 | Broome et al. | | |
| 2006/0028638 A1 * | 2/2006 | Douglas et al. | ........... | 356/139.09 |
| 2007/0124949 A1 * | 6/2007 | Burns et al. | ...................... | 33/288 |
| 2008/0273194 A1 * | 11/2008 | De Sloovere et al. | ... | 356/139.09 |
| 2009/0161093 A1 * | 6/2009 | Downey | .................... | 356/139.05 |

FOREIGN PATENT DOCUMENTS

| | | |
|---|---|---|
| EP | 1174698 A2 | 1/2002 |
| EP | 1512953 A1 | 3/2005 |

* cited by examiner

*Primary Examiner* — Thomas Tarcza
*Assistant Examiner* — Antoine J Bedard
(74) *Attorney, Agent, or Firm* — Armstrong Teasdale LLP

(57) ABSTRACT

Methods and systems for determining a parameter of a vehicle wheel are provided. The vehicle wheel is mounted on a shaft having an axis of rotation. The method includes projecting a pattern onto the wheel wherein the pattern includes a plurality of discrete optically detectable elements and determining a dimensional parameter of the wheel utilizing at least two of the plurality of discrete elements.

28 Claims, 9 Drawing Sheets

METHODS AND SYSTEMS FOR WHEEL PROFILE MEASUREMENT

BACKGROUND OF THE INVENTION

This invention relates generally to vehicle wheel service systems and more particularly, to methods and systems for operation of vehicle wheel service systems such as wheel balancers and tire changers configured to measure a profile of a wheel.

At least some known automotive wheel balancers include a capability of optically scanning a vehicle wheel such as a motor vehicle wheel. A location on the wheel is sensed by means of a light beam emitted by a light source, and the light beam is reflected to a position-sensitive receiver. The spacing of the sensed location relative to a reference location is then measured from the directions of the emitted and reflected beams. The known scanning device includes a shaft on which a vehicle wheel to be measured is rotatable about the axis thereof, with a light source for directing a light beam on to the location on the wheel and a position-sensitive receiver for receiving the reflected beam. An actuator causes synchronous pivotal movement of the light source and the receiver about a common pivot axis, and the measurement values of the receiver are fed to an electronic evaluation system to ascertain the sensed location on the vehicle wheel from a reference location. The light source can be in the form of a laser beam source.

The light source and the receiver of the known scanning device are positioned on a common carrier which is rotated to various positions such that the light source and the receiver move about the axis of rotation synchronously. By positioning the light source and the receiver together facing towards various positions on the wheel rim a contour of the wheel and in particular the internal contour of the wheel rim can be determined.

However, a scanning device that includes a plurality of moving parts, actuators, and bearings is prone to wear and misalignment requiring periodic maintenance, recalibration, and/or verification of proper operation, which is expensive and time-consuming. The time required for the scanned measurement can also be long, even longer than the imbalance measurement itself, and longer than manually entering the dimensions using conventional electromechanical systems.

BRIEF DESCRIPTION OF THE INVENTION

In one embodiment, a method of determining a dimensional parameter of a vehicle wheel mounted on a shaft having an axis of rotation includes projecting a pattern onto the wheel, the pattern including a plurality of discrete optically detectable elements and determining a dimensional parameter of the wheel at an axial position utilizing at least two of the plurality of discrete elements.

In another embodiment, a wheel parameter measurement apparatus for a vehicle wheel service system is provided. The system includes a spindle shaft for mounting a vehicle wheel assembly thereon. The vehicle wheel assembly includes a vehicle wheel rim. The apparatus includes a source of optical energy configured to direct a pattern of a plurality of discrete optically detectable elements onto the wheel rim and an imaging sensor positioned a known distance and orientation from said source of optical energy wherein the imaging sensor is configured to acquire an image of at least some of the plurality of discrete elements. The apparatus includes a processor configured to determine a positional relationship between the imaging sensor and at least two of the plurality of discrete elements from the acquired image and determine a wheel parameter using the determined information.

In yet another embodiment, a wheel service system includes a spindle shaft configured to mount a vehicle wheel assembly thereon. The wheel assembly includes a vehicle wheel rim rotatable about a longitudinal axis of the shaft. The wheel service system further includes a source of optical energy configured to project a pattern of a plurality of discrete optically detectable elements onto the wheel rim and an imaging sensor positioned a known distance and orientation from said source of optical energy, said imaging sensor configured to acquire an image of at least some of the plurality of discrete elements. The wheel assembly also includes a processor configured to determine a positional relationship between the imaging sensor and at least two of the plurality of discrete elements from the acquired image and determine a wheel parameter using the determined information.

DETAILED DESCRIPTION OF THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention. It is contemplated that the invention has general application to automatic component measurement systems and is not limited to implementation in connection with any one particular such system.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
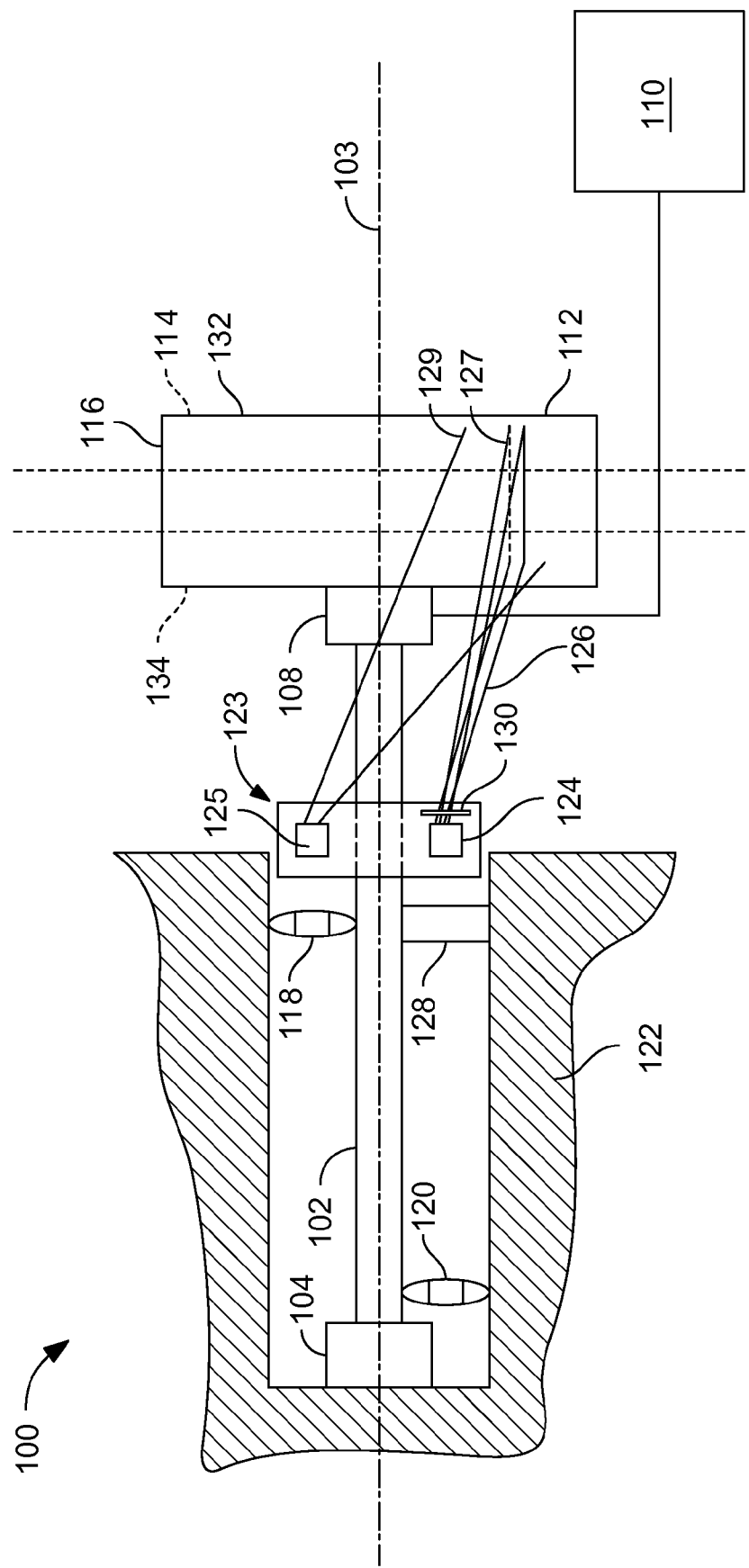
FIG. 1 is a perspective view of a vehicle service system in accordance with an embodiment of the present invention.

FIG. 1 is a perspective view of a wheel servicing system 100 in accordance with an embodiment of the present invention. Vehicle wheel servicing system 100 as shown is illustrative only, as it will be recognized that the particular devices and structures used to obtain dimensional and imbalance information related to a rotating body may be readily changed without changing embodiments of the present invention. Exemplary vehicle wheel servicing systems include wheel balancers and tire changes.

In an exemplary embodiment, wheel servicing system 100, such as a wheel balancer, includes a rotatable shaft or spindle 102 having a longitudinal axis 103 about which shaft 102 rotates. Shaft 102 may be driven by a suitable drive mechanism such as a motor 104 directly coupled to shaft 102 as shown or coupled to shaft 102 through a power transmission device such as a drive belt (not shown). Mounted on or proximate shaft 102 is a position indictor such as a conventional optical shaft encoder 108 which provides speed and rotational position information to a central processing unit 110.

During the operation of wheel balancing, at the end of the shaft 102, a wheel assembly 112 under test is removably mounted for rotation. Wheel assembly 112 may comprise a wheel 114, or wheel 114 and a tire 116 mounted thereon. To determine the wheel assembly imbalance, wheel servicing system 100 includes at least one imbalance force sensor 118 and/or 120, such as a piezoelectric sensor or a strain gauge, coupled to shaft 102 and mounted on a balancing system base 122. Other sensors may be operatively included with wheel servicing system 100 to facilitate performing other wheel servicing operations.

To facilitate balancing and other procedures that may be accomplished using wheel servicing system 100, a wheel profile measurement system 123 may be used. In the exemplary embodiment, wheel profile measurement system 123 includes a light source 124, an imager 125, and a processor (not shown in FIG. 1). Light source 124 is configured to project light 126 towards wheel assembly 112. Specifically, light source 124 is configured to project a pattern of discrete optically detectable elements (not shown in FIG. 1) towards a portion of wheel 114 and/or tire 116. As used herein, the "pattern of discrete elements" defines a grouping of a plurality of discrete optically detectable elements that are projected in a linear, arcuate or random orientation spaced along wheel 114 and/or tire 116. Light source 124 includes one or more light emitting devices (not shown in FIG. 1) in a single housing. In an alternative embodiment, light source 124 includes a plurality of separate housings that each includes one or more light emitting devices. In the embodiment using multiple light sources 124, each may be spaced about shaft 102 such that each light source 124 directs a respective light 126 towards a portion of wheel 114 and/or tire 116. Multiple sources of optical energy may therefore be positioned at different predetermined locations.

Imager 125 includes a field of view (FOV) 129 and is positioned such that FOV 129 is capable of viewing one or more patterns of optically detectable elements projected onto a portion of wheel 114 and/or tire 116. In an embodiment, imager 125 is a one-dimensional imager configured to acquire an image of the optically detectable elements projected onto a portion of wheel 114 and/or tire 116. As used herein, the term one-dimensional imager is used to describe an imager having a single pixel as one of its dimensions, for example, an imager having a detector array of 1×2048 pixels. In other embodiments, imager 125 is a two dimensional imager wherein the field of view of imager 125 is wide enough in a direction perpendicular to axis 103 to be able to view one or more patterns projected onto a portion of wheel 114 and/or tire 116 simultaneously. In various embodiments, light 126 may perform other functions than projecting patterns of discrete optically detectable elements towards wheel 114 for viewing by imager 125. For example, light 126 may be used to illuminate an area of wheel 114 proximate the bottom dead center of wheel 14 or a weight placement location for installing wheel weights as part of a wheel balancing procedure. Additionally, other wheel related procedures may be facilitated by light 126 when a wheel profile measurement procedure is not in progress.

Source 124 emits light 126 that is configured to project a pattern of discrete optically detectable elements by, for example, but not limited to, a diffractive optical element (DOE) 130 positioned in light 126. In other embodiments, a slit aperture, a lens, hologram generation, and/or mirrors are configured to project light in a pattern of discrete elements (ie: can be visible light or non-visible spectrum such as infrared). By using a plurality of discrete optically detectable elements, the optical receiver system can remain in a fixed position and the wheel profile can be determined using just one acquired image. The cost, maintenance, and control complexity of a pivoting stepper motor-controlled single laser spot scanning system are all avoided. And unlike the prior art, no extra time is required to obtain and process multiple images for evaluating the single moving dot of a pivoting scanning system.

For the present invention the DOE is preferred since it provides the most efficient use of available light (no blocked light) and is not susceptible to diffractive edge distortion caused by slit apertures.

Figure 2:
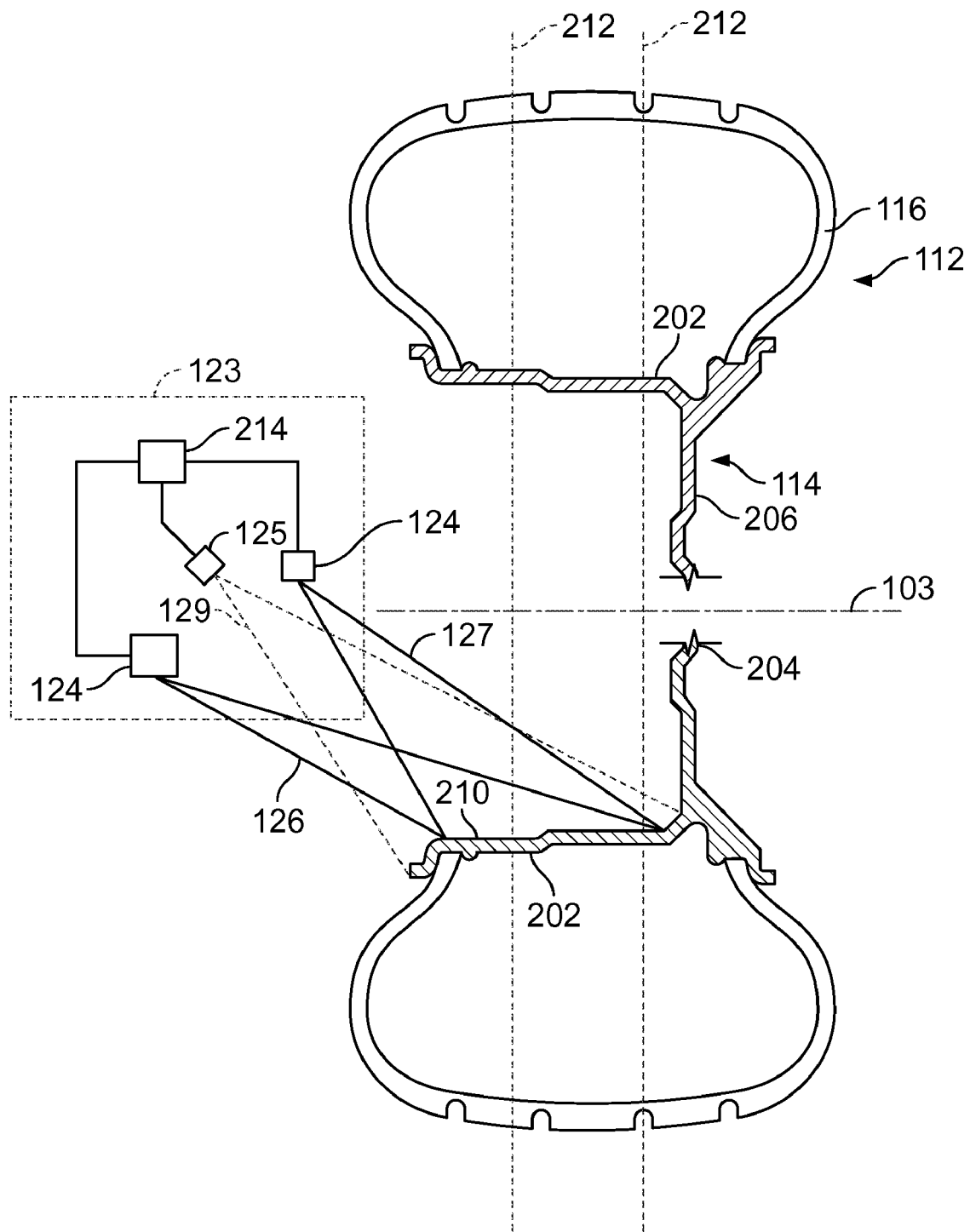
FIG. 2 is a cross-sectional view of wheel assembly and wheel profile measurement system shown in FIG. 1.

FIG. 2 is a cross-sectional view of wheel assembly 112 and wheel profile measurement system 123 (shown in FIG. 1). Wheel assembly 112 includes a wheel 114 having a wheel rim 202 for coupling to wheel 116 to form wheel assembly 112. A wheel hub 204 permits coupling wheel assembly 112 to shaft 102. An annular web 206 extends radially outwardly from hub 204 to rim 202. Wheel rim 202 includes an inner rim surface 208 extending circumferentially about an interior of wheel rim 202. Vehicle wheel servicing system 100 includes wheel profile measurement system 123, which may be installed as a separate subsystem of wheel servicing system 100, or may be assembled within wheel servicing system 100 as an integral part of wheel servicing system 100. Wheel profile measurement system 123 includes one or more light sources 124 each configured to generate and project a pattern of discrete optically detectable elements onto wheel 114 and/or tire 116. The pattern may include a plurality of detectable elements arranged in a substantially straight line or band onto wheel 114 and/or tire 116, in an arcuate line or band along wheel 114 and/or tire 116, or may be projected in a random pattern on wheel 114 and/or tire 116. Each pattern is projected onto an inner surface 210 of rim 202. The discrete elements may appear projected onto surface 210 as alphanumeric elements, shapes, indicia, dots, line segments, symbols, geometric shapes, icons, images, or combinations thereof. Additionally, the discrete elements of each pattern may be projected in different colors and/or wavelengths.

Imager 125 is configured to view the portion of surface 210 where one or more of the patterns of discrete optically detectable elements are projected. Imager 125 may comprise a one-dimensional imager that includes a field of view only one pixel wide. Additionally, imager 125 may comprise two one-dimensional imagers each configured to view a respective pattern of discrete elements. In various other embodiments, imager 125 comprises a two-dimensional imager capable of viewing a pattern of discrete elements oriented as more than one pattern simultaneously, as a band of discrete elements, or as a grouping of discrete elements in any pattern.

In the exemplary embodiment, wheel profile measurement system 123 includes a processor 214 that may be used to control the one or more light sources 124 and imager 125, and to output information to wheel servicing system 100 for further processing and or display. In an alternative embodiment, processor 214 is a processor of wheel servicing system 100.

To eliminate the cost and acquisition time of the prior art moving single light spot (pivoting stepper motor driven), a critical design obstacle had to be overcome for the present invention. Because a plurality of optically detectable elements are projected onto the wheel at once, some optical trait must be unique for at least one of them so that the processing algorithms can recognize which elements are being used in each triangulation computation. In other words, the projected angle must be determined for each optically detectable element processed in an acquired image. Various means to accomplish this will now be discussed which include but is not limited to: providing one or more a uniquely shaped optically detectable elements, providing a missing element (a recognizable gap in the pattern), and providing the preferred solution of uneven but known light ray angle spacing in an encoded manner.

Figure 3C:
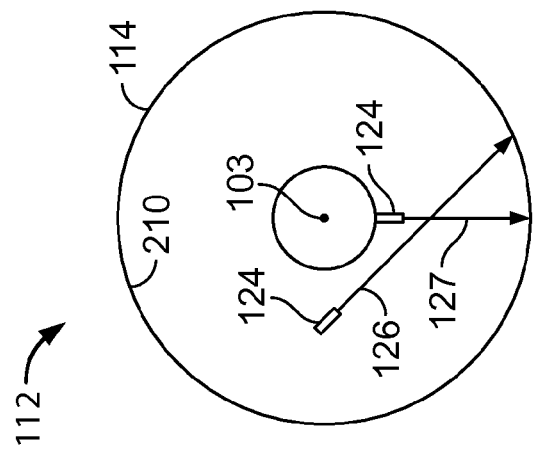
FIG. 3C is a schematic end view of the wheel shown in FIG. 1 with light sources positioned in an exemplary third configuration with respect to the wheel.
Figure 3B:
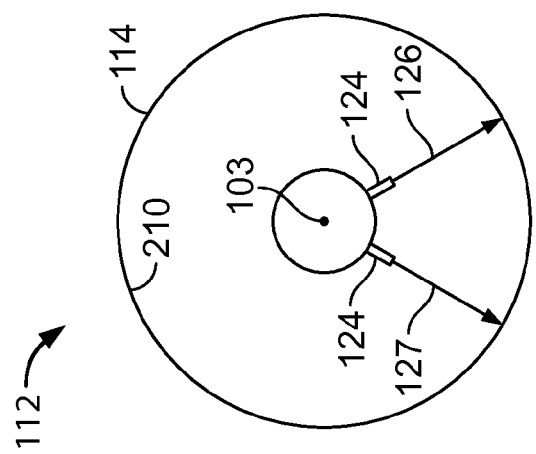
FIG. 3B is a schematic end view of the wheel shown in FIG. 1 with the light sources positioned in an exemplary second configuration with respect to the wheel.
Figure 3A:
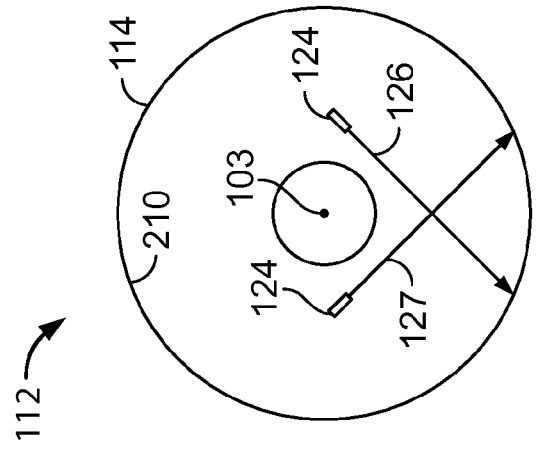
FIG. 3A is a schematic end view of the wheel shown in FIG. 1 with the light sources positioned in an exemplary first configuration with respect to wheel.

FIG. 3A is a schematic end view of wheel 114 (shown in FIG. 1) with more than one light source 124 positioned in an exemplary first configuration with respect to wheel 114. FIG. 3B is a schematic end view of wheel 114 (shown in FIG. 1) with light sources 124 positioned in an exemplary second configuration with respect to wheel 114. FIG. 3C is a schematic end view of wheel 114 (shown in FIG. 1) with light sources 124 positioned in an exemplary third configuration with respect to wheel 114. Light sources 124 positioned as shown in FIG. 3A provide relatively high sensitivity to a variation of a diameter of rim 114. Light sources 124 positioned as shown in FIG. 3B provide a compact design that hides and protects components of light source 124. Light sources 124 positioned as shown in FIG. 3C provide a relative cost savings due to using a bottom dead center (BDC) illuminating laser already used in a weight placement procedure as one of light sources 124 used during a wheel profile measurement procedure. One or both of the light sources 124 may project patterns of discrete optically detectable elements or solid lines of light.

Figure 4:
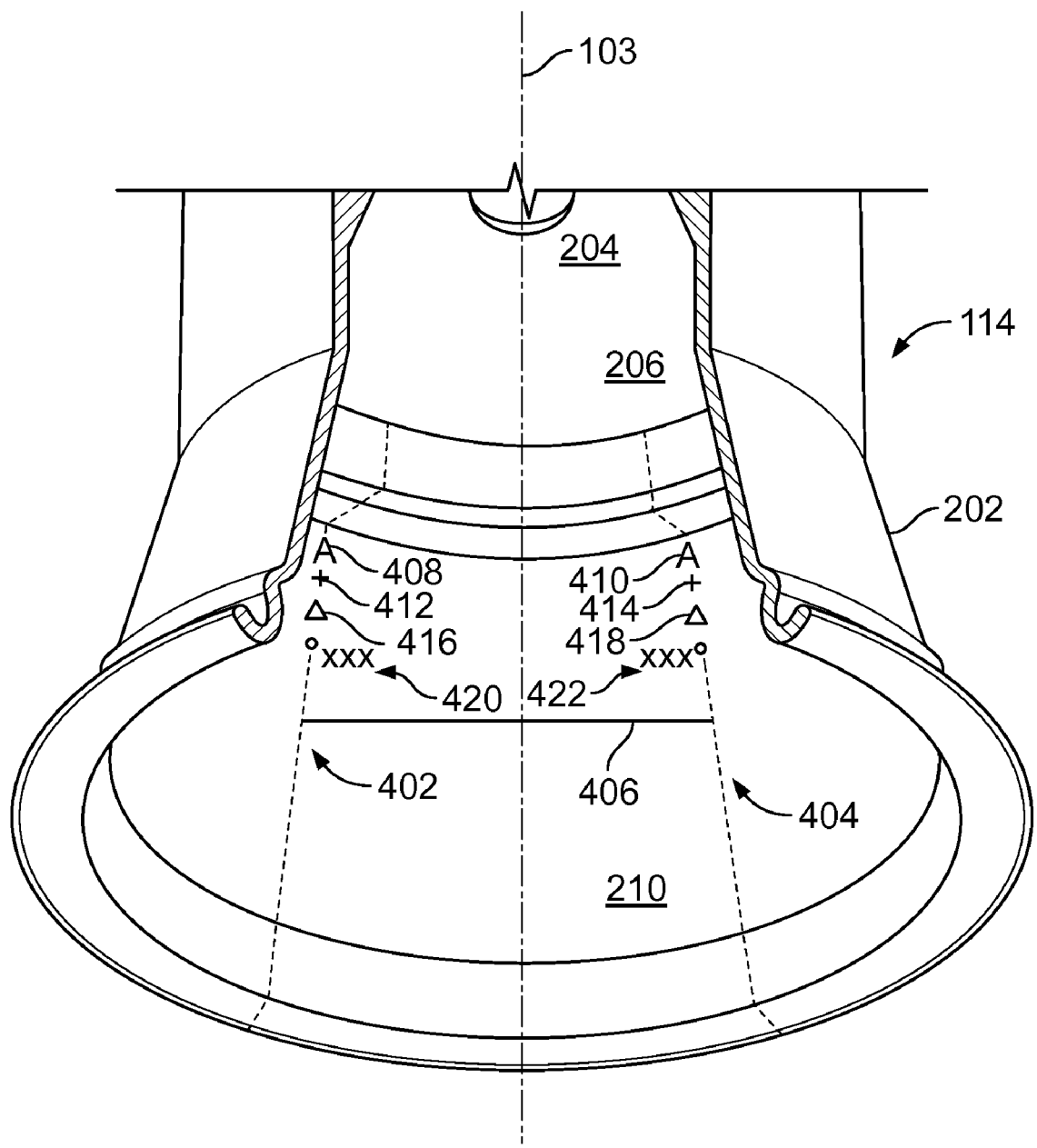
FIG. 4 is a partial cut-away perspective view of the wheel shown in FIG. 1 during a wheel profile measurement procedure.
Figure 5:
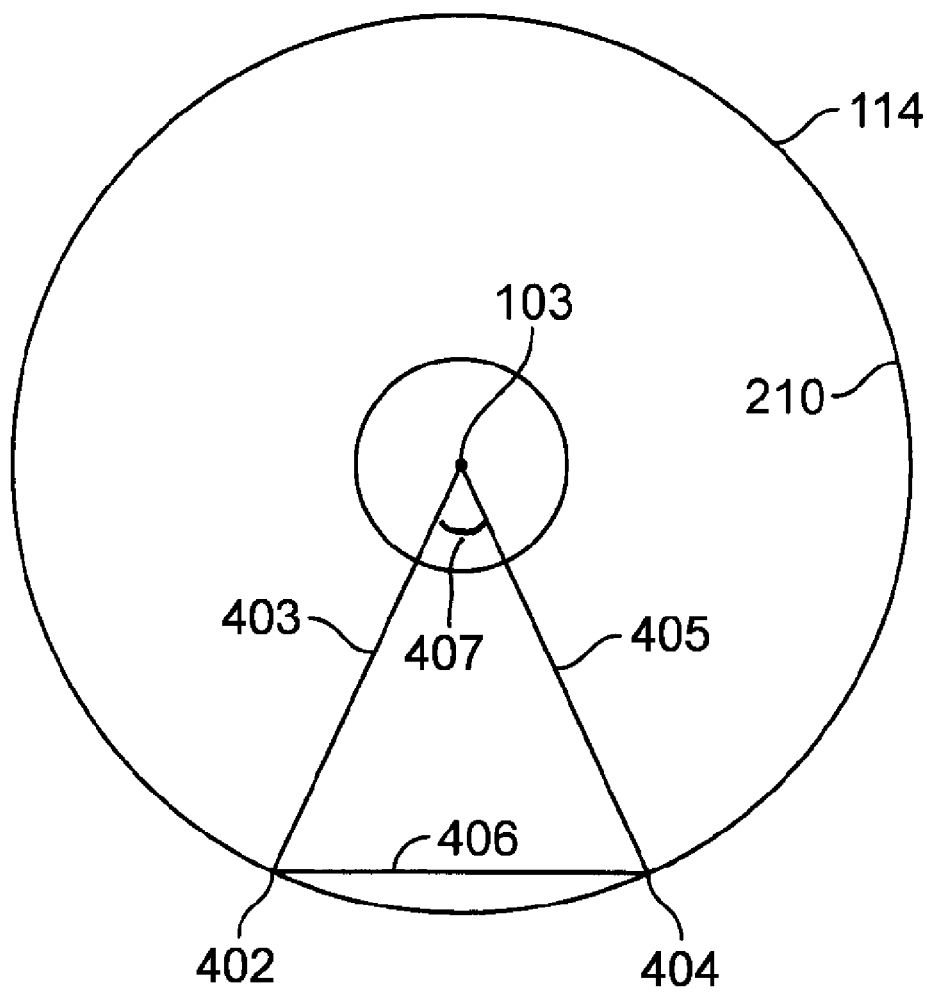
FIG. 5 is an end view of the wheel shown in FIG. 4.

FIG. 4 is a partial cut-away perspective view of wheel 114 during a wheel profile measurement procedure and FIG. 5 is an end view of the wheel 114. In the exemplary embodiment, wheel 114 includes hub 204, web 206, and rim 202. On inner surface 210, a pattern 402 of discrete optically detectable elements is projected onto surface 210 via light rays 403. The discrete optically detectable elements in the pattern 402 may be identified by shape, color, or indicia. For example, a first element 408 may comprise an alphanumeric element, illustrated in FIG. 4 as a letter "A." In another example, a second element 412 may comprise a mathematical operator shape, illustrated in FIG. 4 as an addition sign "+". In still another example, a third element 416 may comprise a geometric shape, illustrated in FIG. 4 as a triangle. In yet still another example, a fourth element 420 may comprise an element with an associated indicia, illustrated in FIG. 4 as a single dot and an alphanumeric identifier "XXX".

In a further embodiment, and as generally shown in FIG. 4 and 5, in addition to the pattern 402 of discrete optically detectable elements, an additional pattern 404 of optically detectable elements may be projected on the inner surface 210 via light rays 405 projected at an angle 407 from the light rays 403, resulting the pattern 404 projected at a location spaced from the first pattern 402 by an apparent distance 406 that may vary with the diameter of the wheel 114. The pattern 404 may, like the pattern 402, include discrete elements which may be identified by shape, color, or indicia, such as a first element 410 (an alphanumeric element illustrated in FIG. 4 as a letter "A"), a second element 414 (a mathematical operator shape such as an addition sigh "+"), a third element 418 (a geometric shape such as a triangle, or a fourth element 422 (an element with an associated indicia, illustrated in FIG. 4 as a single dot and a alphanumeric identifier "XXX".

In yet another embodiment, and also as shown in FIG. 4, each of the patterns of discrete optically detectable elements 402 and 404 may be projected onto inner surface 210 as a plurality of dots extending generally in a line in respective locations on the inner surface, with each pattern 402 and 404 being spaced from one another by the distance 406. The patterns 402 and 404 may likewise appear as an amorphous grouping of dots, or alternatively may comprise an arcuate arrangement of dots or other shaped grouping of optically detectable elements.

Figure 6:
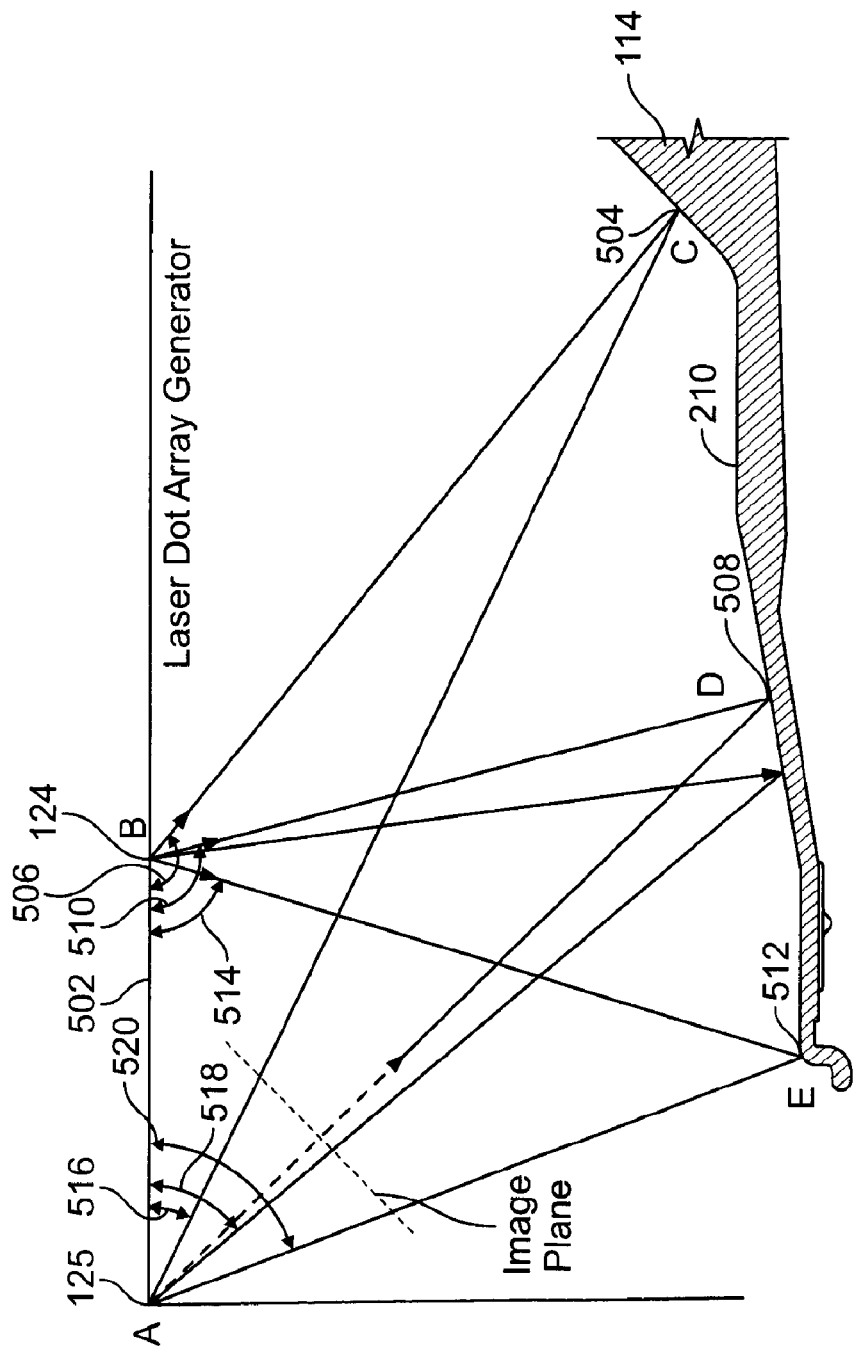
FIG. 6 is a schematic view of an enlarged portion of the wheel rim illustrating an exemplary configuration of a first one of the light sources and the imager for determining a profile of the rim.

FIG. 6 is a schematic view of wheel profile measurement system 123 and an enlarged portion of wheel rim 114 illustrating an exemplary configuration of light source 124 and imager 125 for determining a profile of rim 114. In the exemplary embodiment, light source 124 is positioned a known distance vector 502 away from imager 125 and generates and projects a line of discrete optically detectable elements onto surface 210, such as the line 402 shown in FIG. 4. A first discrete optically detectable element 504 is projected onto surface 210 at a first determinable angle 506 from for example, vector 502. A second discrete optically detectable element 508 is projected onto surface 210 at a second determinable angle 510. A third discrete optically detectable element 512 is projected onto surface 210 at a third determinable angle 514. Although illustrated as using three discrete optically detectable elements projected onto surface 210, any number of discrete optically detectable elements may be used to ensure sufficient resolution along surface 210 to accurately discern variations in a dimensional parameter of surface 210 being measured.

Imager 125 receives images of the discrete optically detectable elements 504, 508, and 512 at respective angles 516, 518, and 520. Each discrete optically detectable element 504, 508, and 512 forms a respective triangle with imager 125 and light source 124. For example, element 504 forms a triangle ABC, with imager 125 and light source 124, element 508 forms a triangle ABD, with imager 125 and light source 124, and element 512 forms a triangle ABE, with imager 125 and light source 124. For each triangle, the side AB is known, because during assembly of wheel servicing system 100 and/or wheel profile measurement system 123, imager 125 and light source 124 are positioned in a known relationship. For each triangle, two angles are determinable directly from the angle at which each element is emitted from light source 124 and the angle from which the element is received by imager 125. Using the law of sines, any other side or angle of each respective triangle can be determined. The position of each discrete optically detectable element is determined based on its determined position with respect to imager 125 and light source 124. A similar determination is made of the positions of the discrete optically detectable elements in the second line of discrete elements (shown as pattern 404 in FIG. 4) after corresponding elements in each line are identified.

Figure 7A:
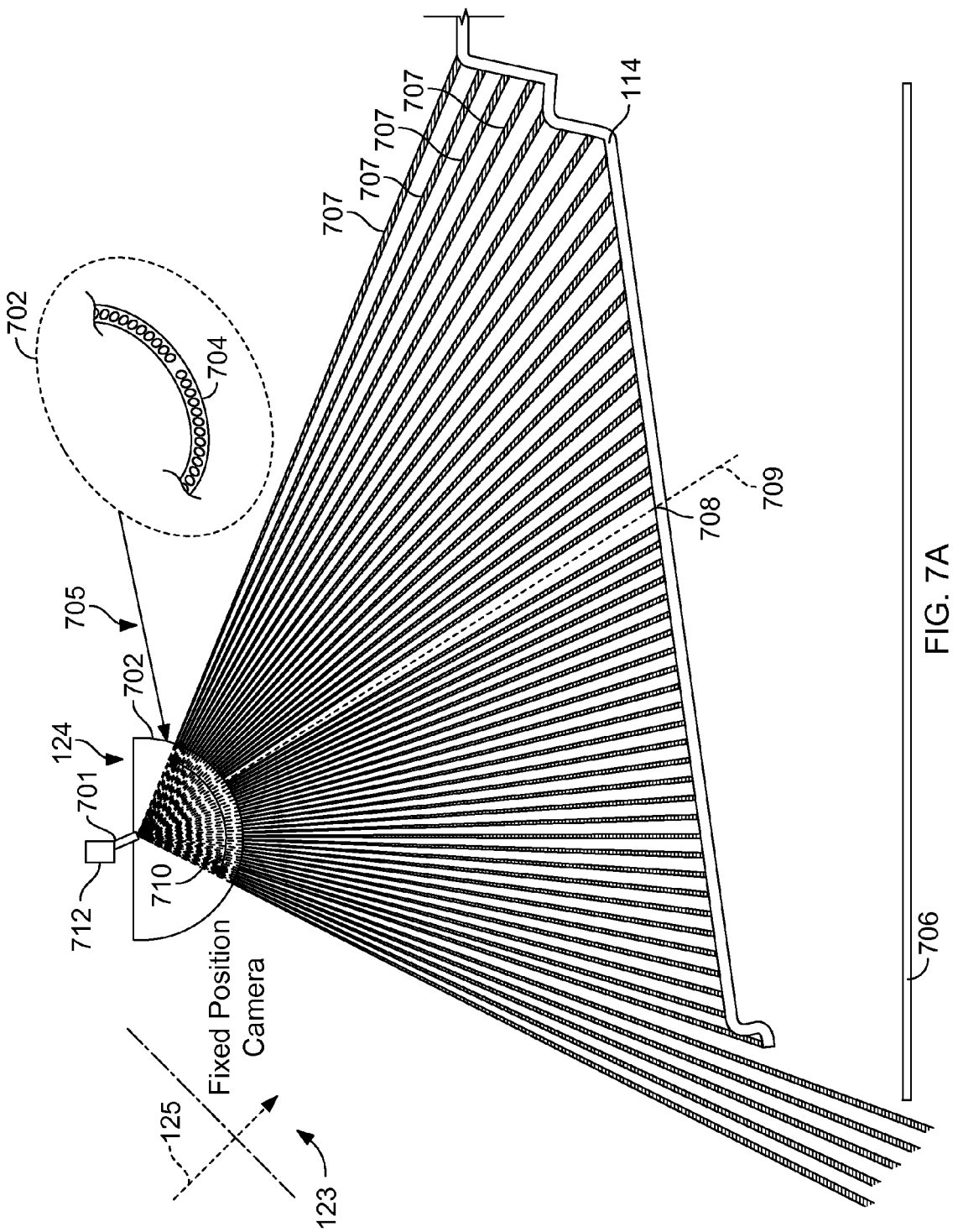
FIG. 7A is a schematic view of the wheel profile measurement system shown in FIG. 1 and an enlarged portion of the wheel rim in accordance with an exemplary embodiment of the present invention.

FIG. 7A is a schematic view of wheel profile measurement system 123 and an enlarged portion of wheel rim 114 in accordance with another exemplary embodiment of the present invention. Light source 124 includes a laser light source 701 and an array generator 702 configured to generate a plurality of beams 707 that is projected along a surface of wheel 114. For example, array generator 702 may comprise a diffractive optical element (DOE) or a slit aperture array that divides a beam 710 projected from light source 124 into a plurality of beams 707 that are projected along a surface of wheel 114. However, light source 124 may also comprise a laser projector, in which case a separate array generator 702 may not be needed. Light source 124 may also comprise more than one light source using visible spectrum or non-visible spectrum (infrared for example) each having separate beams that are directed such that an interference between the beams may also generate a line of discrete optically detectable elements that is projected along a surface of wheel 114. Array generator 702 may also employ hologram generation and/or one or more mirrors and/or rotating mirror components.

Beams 707 are projected at known or determinable angles from light source 124 such that the rim profile is determinable. A calibration mask may be used to determine the spacing between beams 707 prior to a wheel profile measurement process. If all of beams 707 are identical, an indexing optically detectable element may be projected such that the individual beams 707 may be determined. For example, if all of the beams 707 project dots onto wheel 114, an indexing element may comprise a character adjacent or overlaying one of the projected dots. Alternatively, one of beams 707 may be missing, leaving a gap between otherwise evenly spaced beams 707.

In some cases, limitations inherent in light source 124 may not provide sufficient resolution between beams 707 to characterize wheel 114. In such a case, beams 707 may be shifted by actuating positioning assembly 712 such that beams 707 appear in intermediate locations between their positions prior to the actuation of positioning assembly 712. To accomplish this, light source 124 may also include a positioning assembly 712 configured to reposition laser light source 701 and/or array generator 702 such that the projected optically detectable elements are shifted axially along the surface of wheel 114 an amount in each different position of positioning assembly 712. Positioning assembly 712 may be configured to move rotationally or axially. In embodiments of the present invention that use a laser light source, no mechanical movement is required.

Figure 7B:
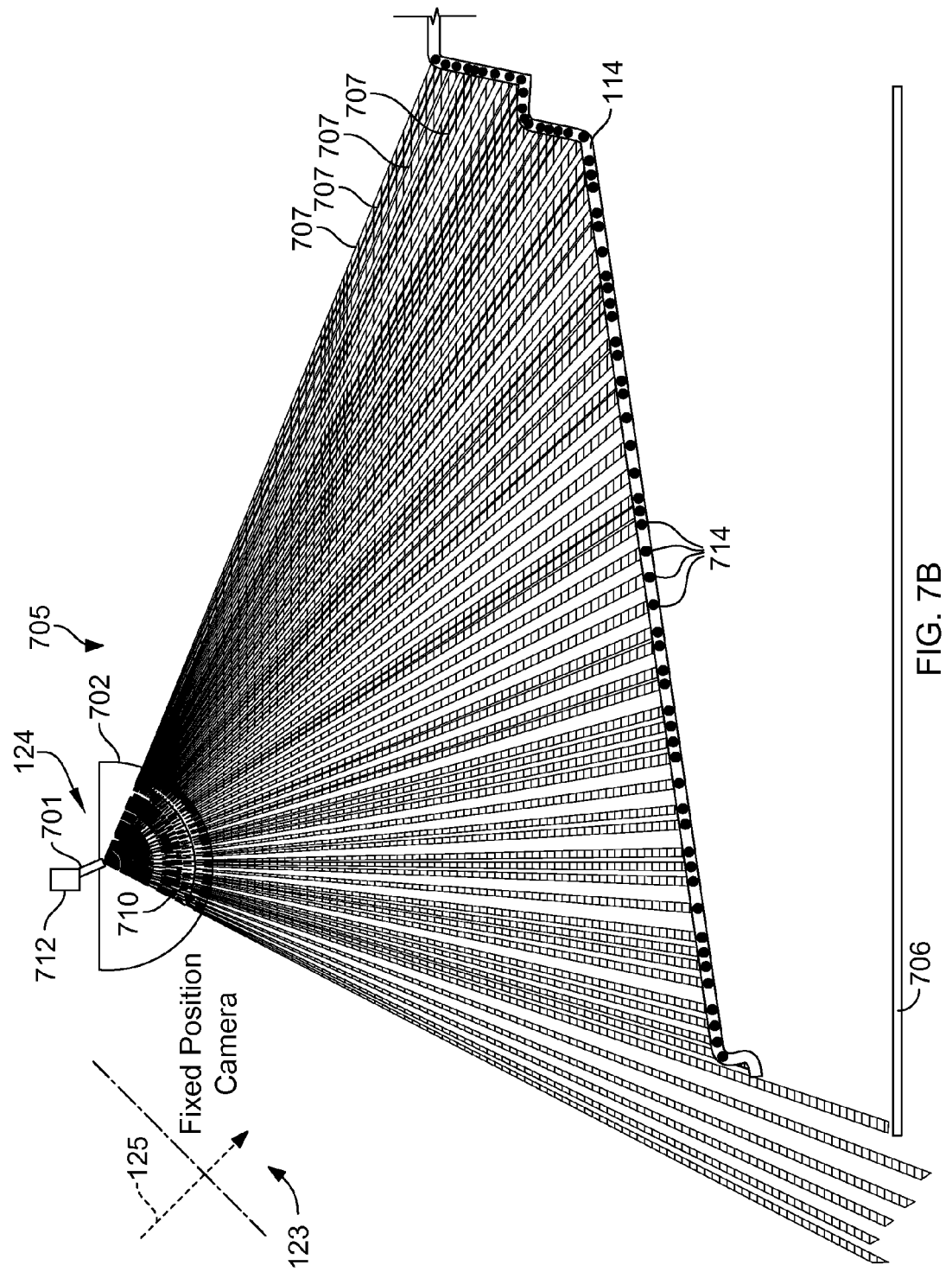
FIG. 7B is a schematic view of wheel profile measurement system shown in FIG. 1 and an enlarged portion of the wheel rim in accordance with another embodiment of the present invention.

FIG. 7B is a schematic view of wheel profile measurement system 123 in accordance with another embodiment of the present invention. In the exemplary embodiment, optically detectable elements 714 appear as simple circular dots on wheel rim 114 and are spaced based on optical parameters of light source 124. In the exemplary embodiment, elements 714 are displayed in a binary-coded spacing where the spacing between them varies according to predetermined optical parameters of light source 124. Such spacing provides improved ability to determine where in the ray fan (which yields the known projected angle) each dot in the image is located, even when many of the dots fail to appear in the acquired image. In fact, only a small grouping of dots (for example, eight), which reliably appear in the image are all that is needed to assist in determining the remainder of the dots in the image. In one embodiment, for constant focus reasons, a ray fan of dots generated by a laser beam and diffractive optical element (DOE) is used. However, the pattern of optically detectable elements is not limited to being generated in this manner. For example, a light source and aperture array may also be used. The center dot in the ray fan is brighter than the remainder of the pattern, providing yet another method to maximize the ability to determine where in the ray fan each dot in the acquired image is located.

A partial list of an exemplary set of laser ray fan angles is shown below in Table 1. The linear pattern of coded-spaced dots also enables the use of a linear imager to reduce cost. The optically detectable elements in the pattern, of course are not limited to simple dots. Ovals, line segments, and even 2D projected shapes could be projected and still provide useful information in the image obtained from a linear imager. Likewise, a more expensive 2D imager could be employed using coded ray fan spacing of the optically detectable elements. Below is a listing of a small grouping of laser dots from a DOE ray fan generator used in the exemplary embodiment of the present invention. The coding is 7 bit where a 0.3 degree angle spacing between rays represents a 0 and a 0.6 degree angle represents a 1. The coding is symmetrical about the center dot however a plurality of other spacing patterns are contemplated. The ray fan spacing could even vary from wheel service machine to wheel service machine due to manufacturing tolerances and the actual fan spacing could be determined and stored using an optical calibration procedure. Additionally, a binary pattern checksum and/or CRC routines may be used on the groupings of patterns recognizable in the ray fan to improve the accuracy in determining which particular output of the ray fan is being scrutinized and to also to more reliably account for missing dots in the detected array (for example rejecting bad sections of data due to shiny wheel surfaces causing reflection or scattering of light).

TABLE 1

| Ray Number | n | n * sin(theta) | Ray Angle |
|---|---|---|---|
| 54 | 18 | 0.094247 | 5.41 |
| 55 | 17 | 0.089011 | 5.11 |
| 56 | 16 | 0.083775 | 4.81 |
| 57 | 15 | 0.078539 | 4.50 |
| 58 | 13 | 0.068068 | 3.90 |
| 59 | 12 | 0.062832 | 3.60 |
| 60 | 10 | 0.052360 | 3.00 |
| 61 | 9 | 0.047124 | 2.70 |
| 62 | 7 | 0.036652 | 2.10 |
| 63 | 5 | 0.026180 | 1.50 |
| 64 | 3 | 0.015708 | 0.90 |
| 65 | 1 | 0.005236 | 0.30 |
| 66 | 0 | 0.000000 | 0.00 |
| 67 | −1 | −0.005236 | −0.30 |
| 68 | −3 | −0.015708 | −0.90 |
| 69 | −5 | −0.026180 | −1.50 |
| 70 | −7 | −0.036652 | −2.10 |
| 71 | −9 | −0.047124 | −2.70 |
| 72 | −10 | −0.052360 | −3.00 |
| 73 | −12 | −0.062832 | −3.60 |
| 74 | −13 | −0.068068 | −3.90 |
| 75 | −15 | −0.078539 | −4.50 |
| 76 | −16 | −0.083775 | −4.81 |
| 77 | −17 | −0.089011 | −5.11 |
| 78 | −18 | −0.094247 | −5.41 |

Figure 8:
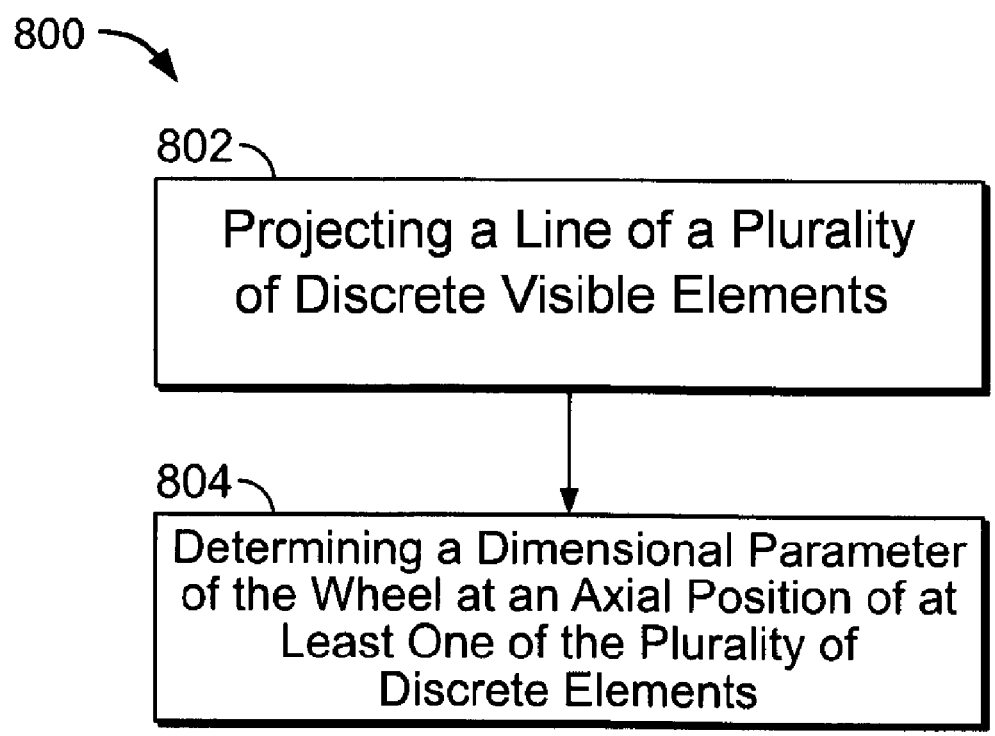
FIG. 8 is a flow chart of an exemplary method of determining a dimensional parameter of the vehicle wheel mounted on shaft having axis of rotation.

FIG. 8 is a flow chart of an exemplary method 800 of determining a dimensional parameter of vehicle wheel 112 mounted on shaft 102 having axis of rotation 103. In the exemplary embodiment, method 800 includes projecting 802 a predetermined pattern of a plurality of discrete optically detectable elements onto the wheel. The predetermined pattern is defined by geometric parameters of the light source projecting the discrete elements onto the wheel or by an aperture or DOE used in conjunction with the light source. Method 800 also includes determining 804 a dimensional parameter of the wheel at an axial position of at least two of the plurality of discrete elements. In an embodiment, the determined dimensional parameter is a profile of the wheel determined using the determined dimensional parameter at a plurality of spaced locations along the axis of rotation. In various other embodiments, the determined dimensional parameter includes for example, at least a portion of the profile of the wheel, dimensions of the wheel, and/or an offset of the wheel rim. From the determined profile a wheel identifier may be determined. As used herein, the wheel identifier comprises the wheel type or a model number or other means that uniquely identifies the wheel such that specifications and information about the wheel can be identified and corresponding wheel servicing characteristics of the wheel may be determined. As used herein, wheel servicing characteristics includes but not is not limited to dimensions, material specifications, wheel finish information, wheel make and/or model information, tire pressure specifications, assembly weight, areas of preferred wheel weight placement, areas of possible wheel weight placement, areas of wheel weight placement to avoid, clip or adhesive weight style/type, drop center geometry, wheel rim offset, wheel rim runout specifications, wheel rim width, center hole information, drop center geometry, balancer cone information, lug nut torque specifications, and bolt circle. Additional dimensional parameters of the wheel rim or the tire may also be determined from the wheel identification and includes but not is limited to a radius, a diameter, a circumference, and a chord length. Wheel servicing characteristics may be determined from a database or lookup table (LUT). The determined wheel servicing characteristics may be displayed for a user in a variety of formats including being projected onto the wheel or rim to facilitate wheel servicing. The determined wheel servicing characteristics also may be input into algorithms used by wheel servicing system 100.

An image of the pattern of discrete optically detectable elements is received using an optical imager positioned in a predetermined location with respect to the shaft and the light source or light sources. The light source in one embodiment includes a laser light emitter configured to direct a beam of laser light through a diffractive optical element (DOE) such that a pattern of discrete elements is generated and projected onto an inner surface of the wheel rim. In an alternative embodiment, the light source comprises a light emitting diode (LED) source. In other various embodiments the light source may comprise other light generating methods such as but not limited to incandescent and fluorescent.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 214, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is projecting datums on a workpiece such as a wheel surface for determining a dimensional parameter of the wheel. Once the dimensional parameter is known the specification for the wheel may be identified and other parameters related to the wheel may then be determined from a look-up table or a database. The determined parameters may be displayed or input into algorithms for further processing. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed or removable drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of determining dimensional parameters of a wheel provides a cost-effective and reliable means projecting datum onto the wheel, accurately determining a wheel parameter using the datum, and determining a profile of the wheel using the determined parameter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of determining a profile of a rim surface of a vehicle wheel, the vehicle wheel mounted on a shaft having an axis of rotation, the shaft provided on a vehicle service system configured as a wheel balancer or a tire changer, the vehicle service system further having a light source and an image sensor each fixedly mounted in predetermined positions relative to the vehicle service system, said method comprising:
    projecting a pattern of light onto the rim surface of the wheel with the light source, the pattern of light including a plurality of discrete optically detectable elements;
    obtaining at least one image of the plurality of discrete optically detectable elements with the image sensor; and
    determining the profile of the rim surface of the vehicle wheel utilizing at least two of the plurality of discrete optically detectable elements in the at least one image.

2. A method in accordance with claim 1 wherein determining the profile of the wheel comprises:
    determining a dimensional parameter of the wheel at a plurality of positions of selectable ones of the plurality of discrete optically detectable elements; and
    determining the profile of the wheel using dimensional parameters determined at the plurality of positions.

3. A method in accordance with claim 2 further comprising determining wheel servicing characteristics of the wheel using the determined profile.

4. A method in accordance with claim 1 wherein projecting a pattern of light comprises directing a beam of laser light through a diffractive optical element (DOE).

5. A method in accordance with claim 1 wherein projecting a pattern of light comprises projecting a pattern onto the wheel using coded-spaced ray fan angles.

6. A method in accordance with claim 1 wherein determining the profile comprises determining a position of at least two optically detectable elements utilizing a predetermined spatial relationship between the image sensor and the light source.

7. A method in accordance with claim 1 wherein determining the profile comprises determining an angular relationship between at least one of the plurality of discrete optically detectable elements and at least one of the image sensor and the light source.

8. A wheel dimensional parameter measurement apparatus for a vehicle wheel service system, the vehicle wheel service system configured as a wheel balancer or a tire changer having a spindle shaft for rotatably mounting a vehicle wheel assembly including a wheel rim having a surface, said apparatus comprising:
    a source of optical energy configured to direct a pattern of a plurality of discrete optically detectable elements onto the surface of the wheel rim, the source of optical energy mounted in a first fixed position relative to the surface of the wheel rim when the vehicle rim is mounted on the spindle shaft;
    an imaging sensor fixedly positioned a known distance and orientation from said source of optical energy, said imaging sensor configured to acquire an image of at least two of the plurality of discrete optically detectable elements; and
    a processor configured to:
        determine a positional relationship between said imaging sensor and at least two of the plurality of discrete optically detectable elements from the acquired image; and
        determine a profile of the surface of the wheel rim using the known distance and the determined positional relationship.

9. An apparatus in accordance with claim 8 wherein each discrete optically detectable element in the pattern is selected from the group of:
    an alphanumeric element, a shape, an indicia, a dot, a line segment, a symbol, a geometric shape, an icon, images, and equivalents and combinations thereof.

10. An apparatus in accordance with claim 8 wherein the source of optical energy is configured to direct a pattern of a plurality of discrete optically detectable elements in a plurality of different wavelengths.

11. An apparatus in accordance with claim 8 wherein said source of optical energy comprises a laser light source and a diffractive optical element (DOE).

12. An apparatus in accordance with claim 8 wherein said pattern of discrete optically detectable elements comprises a first pattern and a second pattern spaced from one another.

13. An apparatus in accordance with claim 8 wherein said source of optical energy is directed through a slit aperture array.

14. An apparatus in accordance with claim 8 wherein said source of optical energy is configured to direct a pattern of a plurality of discrete optically detectable elements onto the wheel rim using coded-spaced ray fan angles.

15. A wheel service system comprising:
    a spindle shaft configured to rotatably mount a vehicle wheel assembly thereon, the vehicle wheel assembly including a vehicle wheel rim having a surface;
    at least one source of optical energy mounted stationary in a predetermined position relative to the spindle assembly and configured to project a plurality of discrete optically detectable elements onto the surface of the wheel rim in a predetermined pattern;
    an imaging sensor fixedly positioned at a predetermined distance and orientation from said source of optical energy, said imaging sensor configured to acquire an image of at least two of the plurality of discrete optically detectable elements; and
    a processor configured to:
        determine a positional relationship between said imaging sensor and at least two of the plurality of discrete optically detectable elements using the acquired image and geometric parameters of the predetermined pattern;
        determine a wheel identifier using the known distance and the determined positional relationship, wherein the wheel identifier is a wheel type, a model number, or other means that uniquely identifies the wheel such that wheel servicing characteristics may be determined; and
        determine a profile of the surface of the wheel rim using the determined wheel identifier;
    wherein the wheel service system is configured as a wheel balancer or a tire changer.

16. A system in accordance with claim 15 wherein said imaging sensor, said source of optical energy, and at least one of the plurality of discrete optically detectable elements define a triangle, and wherein said processor is configured to utilize a value of two of the angles of the triangle and the length of a common side between the two angles using the known distance and the determined positional relationship.

17. A system in accordance with claim 15 wherein said at least one source of optical energy is configured to project a plurality of patterns onto the surface of the wheel rim.

18. A system in accordance with claim 15 wherein said imaging sensor is configured to acquire a single image including the plurality of patterns.

19. A system in accordance with claim 15 further comprising a diffractive optical element (DOE) cooperating with the source of optical energy to project said plurality of discrete optically detectable elements onto the surface.

20. A system in accordance with claim 15 further comprising a slit aperture array cooperating with the source of optical energy to project said plurality of discrete optically detectable elements onto the surface.

21. A method in accordance with claim 1, wherein the rim surface is an inner rim surface.

22. An apparatus in accordance with claim 8, wherein the surface of the wheel rim is an inner rim surface.

23. A system in accordance with claim 15, wherein the surface of the wheel rim is an inner rim surface.

24. A service system for a vehicle wheel assembly including a vehicle wheel rim having an inner surface and an outer surface, the service system comprising:
    a spindle shaft configured to rotatably mount the vehicle wheel assembly thereon;
    at least one source of optical energy configured to project at least one linear pattern of light including a plurality of discrete optically detectable elements on the inner surface or the outer surface of the wheel rim;
    an imaging sensor configured to acquire an image of the plurality of discrete optically detectable elements; and
    a processor configured to:
        determine a positional relationship between said imaging sensor and at least two of the plurality of discrete optically detectable elements using the acquired image; and determine a profile of the inner surface or the outer surface of the wheel rim based on the determined positional relationship.

25. A system in accordance with claim 24, wherein the service system is configured as a wheel balancer or a tire changer.

26. A system in accordance with claim 24, wherein the linear pattern of light is non-movable relative to the inner surface.

27. A system in accordance with claim 24, wherein the plurality of discrete optically detectable elements comprise a plurality of dots.

28. A system in accordance with claim 24, wherein the imager is a two dimensional imager.

* * * * *